United States Patent
Bibelhausen et al.

(10) Patent No.: US 8,248,215 B2
(45) Date of Patent: *Aug. 21, 2012

(54) DYNAMIC CONDITION MONITORING SYSTEM WITH INTEGRATED WEB SERVER

(75) Inventors: David J. Bibelhausen, Maineville, OH (US); Thomas Lee Alford, Milford, OH (US); George F. Hofer, Houston, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,836

(22) Filed: Apr. 19, 2011

(65) Prior Publication Data

US 2011/0193715 A1 Aug. 11, 2011

Related U.S. Application Data

(63) Continuation of application No. 11/529,993, filed on Sep. 29, 2006, now Pat. No. 7,928,833.

(51) Int. Cl.
*G08B 9/00* (2006.01)
*G08B 21/00* (2006.01)
*G08B 23/00* (2006.01)
*G08B 29/00* (2006.01)

(52) U.S. Cl. .......... 340/286.01; 340/679; 340/683; 340/500; 340/506

(58) Field of Classification Search .......... None
See application file for complete search history.

(56) References Cited

U.S. PATENT DOCUMENTS

| 4,418,795 | A  | * | 12/1983 | Trosky et al. ............ 187/391 |
| 4,425,798 | A  | * | 1/1984  | Nagai et al. ............. 73/659 |
| 4,568,909 | A  | * | 2/1986  | Whynacht .............. 187/393 |
| 6,735,630 | B1 | * | 5/2004  | Gelvin et al. ........... 709/224 |
| 2005/0050423 | A1 | * | 3/2005 | Yasukawa et al. ....... 714/742 |
| 2006/0237532 | A1 | * | 10/2006 | Scott-Leikach et al. .. 235/383 |
| 2006/0265106 | A1 | * | 11/2006 | Giles et al. ............ 700/283 |
| 2007/0161380 | A1 | * | 7/2007 | Fok et al. ............. 455/456.1 |
| 2007/0167190 | A1 | * | 7/2007 | Moosavi et al. ........ 455/557 |
| 2008/0084334 | A1 | * | 4/2008 | Ballew ................ 340/990 |
| 2008/0228874 | A1 | * | 9/2008 | Fu et al. .............. 709/203 |
| 2009/0064049 | A1 | * | 3/2009 | Pyhalammi et al. ..... 715/838 |

* cited by examiner

*Primary Examiner* — Julie Lieu
(74) *Attorney, Agent, or Firm* — Fletcher Yoder, P.C.; R. Scott Speroff; John M. Miller

(57) ABSTRACT

A dynamic condition monitoring system is disclosed, such as for monitoring vibrations in complex machine systems. The system includes monitors on which server software is provided. The server software may access pre-defined graphical user interface pages that can be populated and served directly from the monitors. The data may be accessed via conventional networks for viewing and analyzing monitored data, as well as for configuration of the individual dynamic condition monitors.

20 Claims, 8 Drawing Sheets

FIG. 7

DYNAMIC CONDITION MONITORING SYSTEM WITH INTEGRATED WEB SERVER

CROSS REFERENCE TO RELATED APPLICATIONS

This application is a continuation of application Ser. No. 11/529,993, filed Sep. 29, 2006, entitled "DYNAMIC CONDITION MONITORING SYSTEM WITH INTEGRATED WEB SERVER" in the name of David J. Bibelhausen et al.

BACKGROUND

The invention relates generally to monitoring and protection systems, and to techniques for remotely interfacing with such systems. More particularly, the invention relates to dynamic condition monitoring systems, such as for rotating equipment, in which web-accessible parameters, configurations, and so forth may be provided directly from monitors coupled to sensors for monitoring dynamic conditions in a machine system.

A wide range of applications exist for monitors and protection systems for machine systems used in industrial, processing and other environments. In the area of dynamic parameter or condition monitoring, moving machinery is often instrumented with various sensors and transducers which detect physical conditions of machinery and generate signals representative of the conditions. The sensors may detect conditions such as movement, position, speed, vibration, temperature, and so forth. In dynamic condition monitoring systems, the physical state, movement or trend in movement of specific portions of a machine are of interest. The signals may be processed and utilized to analyze the operating state of the machinery, as well as potential problems with the machinery, as or even before they occur. The parameters may also be used for control functions such as for regulating speeds, maintaining work flows, and so forth. Finally, protection functions may also be implemented based upon sensed conditions, such as to avoid damage or other unwanted conditions in the machine system.

One of the many constraints in the design and application of such systems is the access to sensed or analyzed conditions, parameter settings, programming, alarm settings, configuration data, and other monitoring and control aspects that may be stored in distributed monitors. Such distributed monitors have been developed and work extremely well when networked with one another via conventional network media or wirelessly. However, remote monitoring and configuration of the monitoring equipment is often a challenge. In some environments, certain data may be downloaded to or uploaded from remote monitors, or programming at the monitor itself may be required. Such programming may be difficult when the monitors are installed in existing factories or difficult-to-access settings. While some monitoring systems may permit access to some settings and remote configuration of monitors, these generally rely upon properly network extensions and involve file transfers in a manner that could still be improved upon.

A similar difficulty arises from the need to monitor or be alerted of abnormalities in machine systems as they arrive. For example, vibration monitoring may provide highly important information as to the good operating state of equipment, or conversely, of the need to service or even shut down the equipment. Current systems provide a limited ability to perform remote alarm or messaging, but further improvement is much needed.

In summary, there is a significant need in the field of dynamic condition monitoring for improved techniques for accessing information in distributed monitors, and programming or configuring such monitors from a remote location.

BRIEF DESCRIPTION

The present invention provides a novel technique for accessing data from, configuring, and receiving alerts and other information from dynamic condition monitoring systems designed to respond to such needs. In its simplest form, the invention may rely upon server software (a "server") stored in a condition monitor. The software may provide for web pages that are stored in the condition monitor and that can be populated with parameter settings, monitored values, and even processed data, such as trend data, vibration spectra, and so forth. The web pages may be accessed remotely via a conventional network, such as over the Internet. The pages are thus accessible for configuration of the dynamic condition monitor, as well as for viewing status parameters for the equipment, setting alarms, and so forth. The server stored in the monitors may also serve to automatically notify monitoring or control systems, and plant personnel, or service providers of both routine operation of monitored machinery and abnormal or alarm conditions that will require or immediately require attention.

The web-based interface for the condition monitors may also be integrated with an enterprise-level analysis or reporting system. That is, information from individual condition monitors may be integrated with one another, and entire portions of a plant or facility may be further integrated for analysis, planning, reporting and similar functions. At an upper level, financial, maintenance and other functions may be further integrated in the enterprise based upon information accessible from the individual condition monitors. The condition monitors may thus be an integral part of an overall enterprise system where analysis and decisions are made based upon information detected in, stored in and served by individual condition monitors.

DRAWINGS

These and other features, aspects, and advantages of the present invention will become better understood when the following detailed description is read with reference to the accompanying drawings in which like characters represent like parts throughout the drawings, wherein:

FIG. 7 is an exemplary problem summary page that can be populated and served by one or more condition monitors.

DETAILED DESCRIPTION

Figure 1:
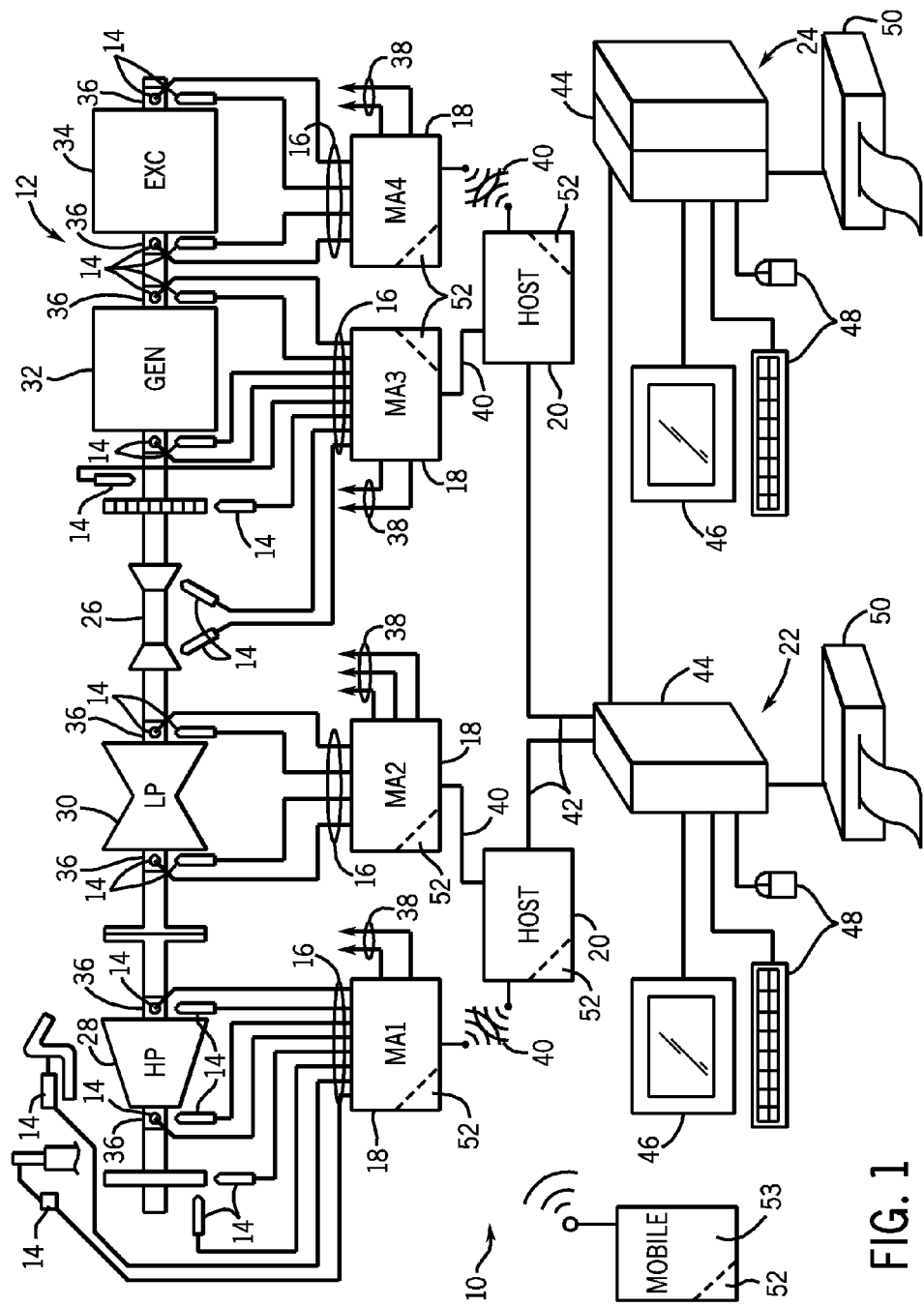
FIG. 1 is a diagrammatical overview of an exemplary machine system instrumented with condition monitors for detecting, storing, processing and serving data and interface pages in accordance with aspects of the present technique.

Turning now to the drawings, and referring first to FIG. 1, a diagrammatical overview is illustrated of a monitoring and protection system 10 applied to an exemplary machine system 12. The monitoring and protection system 10 is particularly well-suited for detecting, monitoring, and controlling a wide range of dynamic operating parameters of machine systems. In particular, the system is well-suited to various types of rotary equipment, although other applications may be envisaged for certain aspects of the present technique. As used herein, the term "dynamic operating condition," or the reference to dynamic conditions in general, is intended to convey physical conditions or parameters of a machine system, as opposed, for example, to electrical conditions. The dynamic conditions may include such characteristics as vibration, rotation, speed, temperature, pressure, and so forth.

The monitoring and protection system 10 is designed to permit selective monitoring of dynamic operating conditions and parameters at various points along a machine system. In general, these points will correspond to locations at which such parameters can be sensed, and may be separated, independent or quite distal from one another. In the implementation illustrated in FIG. 1, for example, the mechanical system 12 generally represents a power generation system in which a wide range of dynamic operating conditions are monitored on a continual basis for informational, protection and control purposes. Accordingly, the monitoring and protection system 10 includes a series of sensors, detectors or transducers 14 mounted near or on various points of the machine system to detect the desired dynamic operating conditions. Communication lines 16 extend from the various sensors and transducers to monitoring assemblies 18, generally referred to herein simply as "monitors".

The monitors may be placed proximate to, adjacent to, or relatively close to the various monitored locations or points, and need not be grouped as in certain heretofore known systems. Certain of the monitors, which will be described in greater detail below, may be linked via hosts 20. The hosts, or the monitors directly, may be linked to central or remote monitoring stations 22 and 24 both within a plant or installation, or remote from the plant or installation. Typically, the monitors 18 will be mounted closely adjacent to specific points or locations which are monitored, while hosts, if present, will be positioned near groups of monitors, or adjacent to a monitor. The central or remote monitoring station is typically provided in a desired plant location, such as a control room, for programming, monitoring, protection and control functions.

In the exemplary mechanical system 12 illustrated in FIG. 1, rotary shaft 26 links a series of functional sections of the system, including a high pressure turbine section 28, a low pressure turbine section 30, a generator 32 and an exciter 34. As will be appreciated by those skilled in the art, the shaft and various components of the system are supported by a series of bearings 36. Other components may clearly be included in the system, although the representation of FIG. 1 has been intentionally simplified for explanatory purposes.

Throughout the present discussion it should be borne in mind that the turbine mechanical system of FIG. 1 is simply an example of one application. The present technique may be applied in a wide range of industrial settings, including to material handling applications, production equipment, assembly stations and lines, to name only a few. Moreover, the various components of the mechanical system need not be linked by a single shaft, but may be disparate and linked only functionally in the overall system design. In the case of a turbine system, however, the various sensors, transducers, monitors, and other components of the system may form part of a turbine supervisory instrumentation system.

The various sensors and transducers 14 of the monitoring and protection system 10 may produce a wide range of signals based upon the detected dynamic operating conditions. Each generates one or more signals which is applied to monitors within each monitor 18 via the communication lines 16. The various transducers may be active or passive, and may receive power for operation via the communication lines. By way of example, the sensors and transducers of the instrumented turbine system of FIG. 1 may detect dynamic operating conditions such as valve position and case expansion, as indicated diagrammatically to the upper left in FIG. 1, eccentricity, bearing absolute casing vibration, both in X and Y directions, shaft absolute and shaft relative vibration (more suitable, for example to turbine monitoring), differential expansion, speed of rotation, rotational phase, and so forth. As will be noted by those skilled in the art, various sensors and transducers may be employed for these purposes, including linear variable differential transformers, non-contact pickups, rotary potentiometers, accelerometers, and so forth. Indeed, in a present implementation, the particular configuration of monitors within the monitors includes a specially adapted vibration monitor designed to be coupled to a tachometer and to an accelerometer. Such accelerometers may detect, for example, signals indicative of shaft, casing, or pedestal vibration, depending upon the application.

The monitors 18 serve generally to receive, process, report and act upon the signals supplied by the sensors and transducers. For example, specific monitors within the assemblies may process input signals to produce vibration data which is used to analyze the performance or operating conditions of the mechanical system. Where desired, and as described more fully below, specific processing of this type may be implemented via the monitors of each or certain monitors, and closed-loop protection of the equipment may be provided, such as to energize or de-energize the components or a single component of the system. As will be appreciated by those skilled in the art, certain of the monitored dynamic operating conditions may be particularly indicative of abnormal and unwanted conditions, such as wear, impending failure, unbalance, excessive loading, and so forth. Also as described more fully below, certain monitors may be designed to energize or de-energize an internal or external relay or similar switch to permit rapid control and protection functions. It should be noted that, as used herein, the term "relay" applies generally to a variety of switching devices which may be controlled by the monitors, such as conventional electromechanical devices, solid state devices, as well as other switching systems.

In addition to processing and analysis within the monitors of each monitor, each monitor may generally provide outputs for external devices as indicated at reference numeral 38 in FIG. 1. The outputs may include electrical signals which can be applied to dedicated components, such as motors, alarms, lights, valves, and so forth. These outputs are generated based upon the monitoring and analysis functions performed by the monitors and, depending upon the programming of the various monitors, with input from remote devices such as the other monitors or a central or remote monitoring station.

Any particular configuration of the monitors may make use of the server-based innovations summarized below, including conventional backplane-based monitoring architectures. However, the monitors of the present technique make use of an open industrial data exchange protocol for the exchange of information both between monitors, and between the monitors of different monitor assemblies, and may use the same protocol for the exchange of data with remote devices such as hosts and central or remote monitoring stations. A variety of such protocols have been developed and are presently available, including protocols designated generally in the industrial field as DeviceNet, ControlNet, Profibus and Modbus. Certain of such protocols may be administered by industry associations or bodies to ensure their open nature and to facilitate compliance with the protocol standards, such as the Open DeviceNet Vendors Association. It has been found that the use of a standard open industrial data exchange protocol for some or all of the communications between the monitors, between assemblies, and between remote devices and the monitors and assemblies, greatly enhances the interchangeability and applicability of the present system in various settings.

Due to the use of the open industrial data exchange protocol, the monitors, and the various monitors within the assemblies, may be linked to one another via standard network media 40, illustrated between the monitors 18 and the host 20 in FIG. 1. Similar media may be routed both within each monitor, and between monitors. While any suitable media may be employed for this purpose, for data exchange only, a two-conductor or shielded cabling system may be employed. Where, as in the present system, data and power may be provided at certain locations, a conventional network media such as a four-conductor cable may be applied for network media 40. In the present embodiment, the media may include both power and data conductors disposed in a flat insulating jacket designed to interface the conductors with devices by conventional termination and by insulation displacement connectors. Other network media may, of course, be employed. Further network media 42 serve to link the monitors or hosts with remote monitoring equipment. It should be noted that the media 40 and 42 may be identical where desired.

It should be noted, however, that as illustrated in FIG. 1, some or all of the communications between monitors, between the monitors and sensors, between the monitors and central monitoring stations or hosts, and even between sensors, may be made via wireless communications systems. For example, present wireless standards that satisfy the needs of the system might include ZIGBE, IEEE 802.11, Bluetooth, and so forth. Other technologies that are presently suitable, or that may soon be suitable include cellular telephony techniques. For distant communications, the techniques may include point hopping technologies, in which monitors are scheduled to sleep and awaken to send and receive signals on a predetermined basis. Such techniques will allow for wireless communications at greater distances, and will also reduce the power required for driving the monitoring equipment and sensors.

It should also be noted that some or all of the functionality provided by the inclusion of a server and server software in the monitors, as described below, may be obtained in accordance with the invention in monitors that are not configured in a modular arrangement. Thus, conventional backplane-mounted and interconnected dynamic condition monitoring systems may similarly be equipped with the server capabilities described below, and provide populated user viewable pages in accordance with the invention.

The various centralized or remote monitoring stations 22 and 24 may include any suitable equipment, such as general purpose or application-specific computers 44, monitors 46, interface devices 48, and output devices 50. Although simple computer systems are illustrated diagrammatically in FIG. 1, those skilled in the art will recognize that the centralized or remote monitoring stations may include highly complex analytical equipment, logging equipment, operator interface stations, control rooms, control centers, and so forth. As noted above, while at least one such monitoring station will typically be provided at or near the application, other stations may be provided entirely remote from the application, such as for monitoring plants, lines, production equipment, offshore facilities, and the like from entirely remote access points.

The monitors 18, which may be configured as modules, include, in accordance with aspects of the present invention, server software, sometimes referred to herein as a "server", indicated generally by reference numeral 52 in FIG. 1. The server software may include commercially available server packages that can be stored in the memory of each monitor and that can include predefined views, screens or pages that are served to remote users for configuration and monitoring purposes. A number of such pages are illustrated in FIGS. 2-7 and described in greater detail below. In general, however, the pages will include fields that are populated with either raw, processed or computed data and values based upon data sensed and collected by each monitor. It should be noted that some of the monitors may not include such server software, although all such monitors are illustrated in FIG. 1 as including the software. Where one or more of the monitors does not include server software, its raw data, processed data, or configuration parameters may be communicated to other monitors that are equipped with server software such that the same parameters may be available by accessing the server software in the monitors that are so provided. One or more of the monitors, moreover, may perform calculations or summaries for its own monitored operating parameters and settings, and may also incorporate those of other monitors for a higher-level summary. The server software may also, or instead, be provided in components such as hosts 20. Such hosts may perform data integration functions, calculations, and so forth based upon data monitored by individual monitors or collections of monitors. Where appropriate, the server software may only be provided in such hosts, with the host accessing the required data to populate the served pages directly from the monitor. Similarly, such server software may be provided in mobile devices, as indicated generally by reference numeral 51 in FIG. 1. Such devices may be used by plant, maintenance and service personnel, for example, to collect data from monitors and monitoring systems, for analysis and, where desired, for relay to other monitoring systems or central monitoring stations.

As will be appreciated by those skilled in the art, the server software may reside on the memory of the monitor or host, and the processor included in the monitor or host may be called upon to populate served pages and serve the pages to a remote user when prompted to do so. Moreover, while separate or add-on modules may be coupled to the monitors for providing the server functionality described herein, in a presently contemplated embodiment, the server is integrated in the monitor itself. In the presently contemplated embodiment, for example, the monitor or hosts will be designated via a conventional Internet protocol (IP) address on a known network. The monitor or host may then be accessed by appropriately addressing data exchange to and from the IP address.

Any suitable protocol may be used for this purpose, such as conventional TCP/IP protocols. Where desired, authentication routines may be included, such as to request a user name and password for access to the stored data on the monitors or hosts.

In operation, the individual monitors, hosts, or collections of monitors may perform a variety of analysis, output and alarm functions, all of which may be set, controlled and reported via pages stored and populated in the monitors. In a present implementation, for example, the monitors may detect such parameters as vibration, or vibration-related measurements, speeds, and so forth. One or more of the monitors will then either transmit the raw data to other locations (e.g., other monitors, hosts, or central monitoring stations), or process the collected data to determine further parameters of interest. For example, again in a present implementation, such processing includes analysis of received signals for determination of vibration data, such as via a Fast Fourier Transform. Each monitor may include specialized processors adapted for these functions, as well as memory circuitry for storing configuration parameters in processing routines.

Based upon such processing, output signals may be produced and provided to external devices, or to components local to each monitor, such as for controlling external relays, alarms, lights, LEDs, and other devices. At least certain of the monitors in a present embodiment may further include an integrated relay which may produce output signals in a similar manner, such as for completing or interrupting a current carrying path through a load, such as a motor control device, starter, valve, indicator light, alarm, and so forth.

As mentioned above, a present implementation of the techniques and monitor designs discussed herein accommodates analysis of vibration data. Such vibration data may be a key component in mechanical system monitoring, control and protection. In a present implementation, vibration profiles are generated in dedicated vibration monitors based upon multiple channels of signal acquisition, from accelerometers and tachometers. The circuitry within the vibration monitors performs any suitable analysis to generate vibration data, which may be presented as a vibration profile. Alarm or alert ranges, limits, levels, and the like may be established and combined with the vibration data for monitoring, protection and control functions both within the monitor and in conjunction with other monitors and control devices.

As describe below, such data, including where desired vibration data and profiles, may be accessed remotely via the server software 52 disposed in some or all of the monitors. Moreover, alarms, alert ranges, limits, levels, and operating and calculation parameters and settings can be viewed and even configured via the server software.

Figure 2:
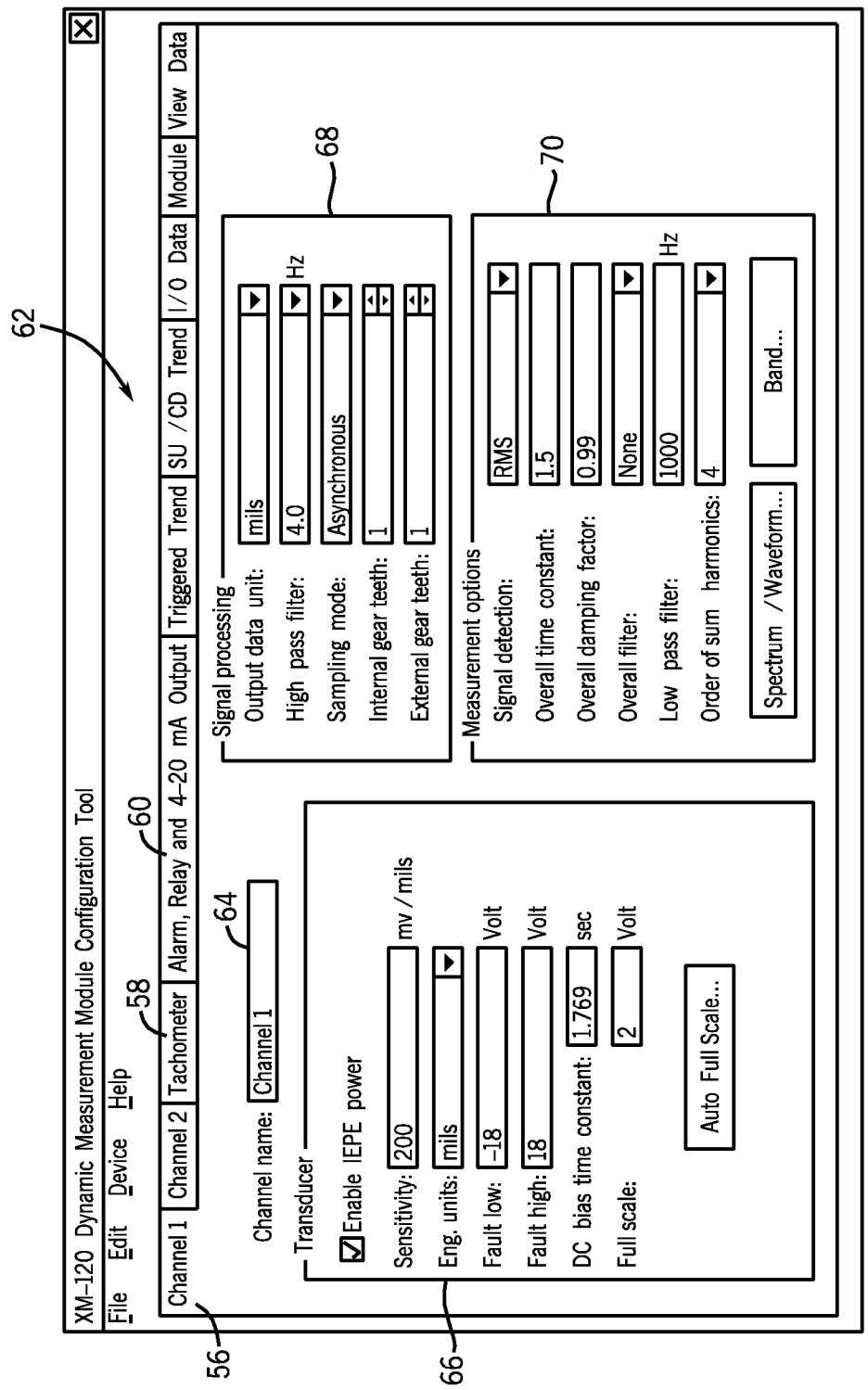
FIG. 2 is an exemplary interface page that may be served to a remote user by one of the monitors of FIG. 1.

FIG. 2 is an exemplary interface page that may be stored on and served by a monitor, populated with data from that monitor or from other monitors, or from a combination of monitors. The interface page 54 shown in FIG. 2 summarizes both configuration parameters and settings for the monitor. In the implementation illustrated, the monitor is a two-channel monitor, such that tab 56 is provided with summary data for each of the two channels. The invention is not, of course, limited to any number of channels or to any particular data served by the dynamic condition monitors. In the illustrated embodiment, however, the dynamic condition monitor serving the page also monitors speed of the machine system via a tachometer, for which a separate tab 58 is provided, and allows for the setting of alarms and outputs, the settings and status of which can be accessed from a tab 60. Other tabs 62 are provided in the page, such as for determining trends, setting and verifying monitored parameters in input and output modules, for viewing monitored data, including historical data, and so forth.

The channel tab 56, by way of example, is populated by both parameter settings and by data or indications based upon actual monitoring of the machine system. In the illustrated embodiment, the first channel can be allocated a channel name, as indicated by reference numeral 64. Various transducer or sensor settings can be input via a window 66, such as the sensitivity of a transducer, the units in which data will be reported or converted, fault limits, and so forth. In a presently contemplated implementation, the page is served from the monitor, and any changes made by the operator, even at a remote location, will be downloaded and stored in the monitor for future use. In the page 54 illustrated in FIG. 2, other data may also be specified, such as signal processing parameters, designated generally by reference numeral 68 for the calculations made based upon the dynamic conditions monitored. Another window 70 is provided in the illustrated embodiment for various measurement options, these being specifically adapted to vibration monitoring in the illustrated embodiment.

As will be apparent to those skilled in the art, the views or page served by the monitors, in a present embodiment, are designed for display in a conventional web browser. The remote user, then, need only open a conventional browser and access the monitor at the appropriate IP address input via the browser. Where authentication routines are included, the user may be prompted to provide verification of identification and other access-control information, such as a password. Where desired, access may be limited to specific computers designed to operate remotely. The present system may also implement various levels of permission, such that certain users may access configuration parameters and sensed or processed data as well as configure the monitor, while other users may access limited data sets, or be precluded from changing the configuration on a monitor.

It should be noted that a wide variety of configuration parameters may be stored within each monitor, and some or all of these may be set or altered via web pages of the type shown in FIG. 2. For example, sensor or transducer parameters may include the transducer type, its sensitivity, units of measure, low and high fault settings, DC bias time constants, and so forth. As shown in FIG. 2, in vibration monitors, parameter settings may include such settings as channel name (for each of the multiple channels provided), output data units, high pass filter settings, full scale settings, sampling mode settings (e.g. synchronous or asynchronous), and so forth. Overall measurement parameters may also be set, such as for RMS calculations, peak calculations, peak-to-peak calculations, overall time constant calculations, damping factor calculations, as well as a range of spectrum and time waveform parameters. The latter may include values such as maximum frequency, number of lines or bins in spectrum measurements, period of waveforms, number of samples in waveform measurements, and window type (e.g. Hanning, rectangular, Hamming, flat top, and Kaiser Bessel). Band measurement parameters may also be set, such as RSS and peak signal detection settings, minimum and maximum frequencies in bands, and so forth. Similarly, various settings may be provided for speed or tachometer settings, such as for averaging, pulses per revolution, trigger mode, and so forth. In general, in presently contemplated monitors, an analog-to-digital converter receives conditioned signals and applies these signals to a digital signal processor either directly, as in a present embodiment, or indirectly such as via a CPU. Dedicated processing can be performed on the signals, such as by application of analysis routines which may include a Fast Fourier Transform to establish a vibration profile over a range of speeds or frequencies of interest.

Figure 3:
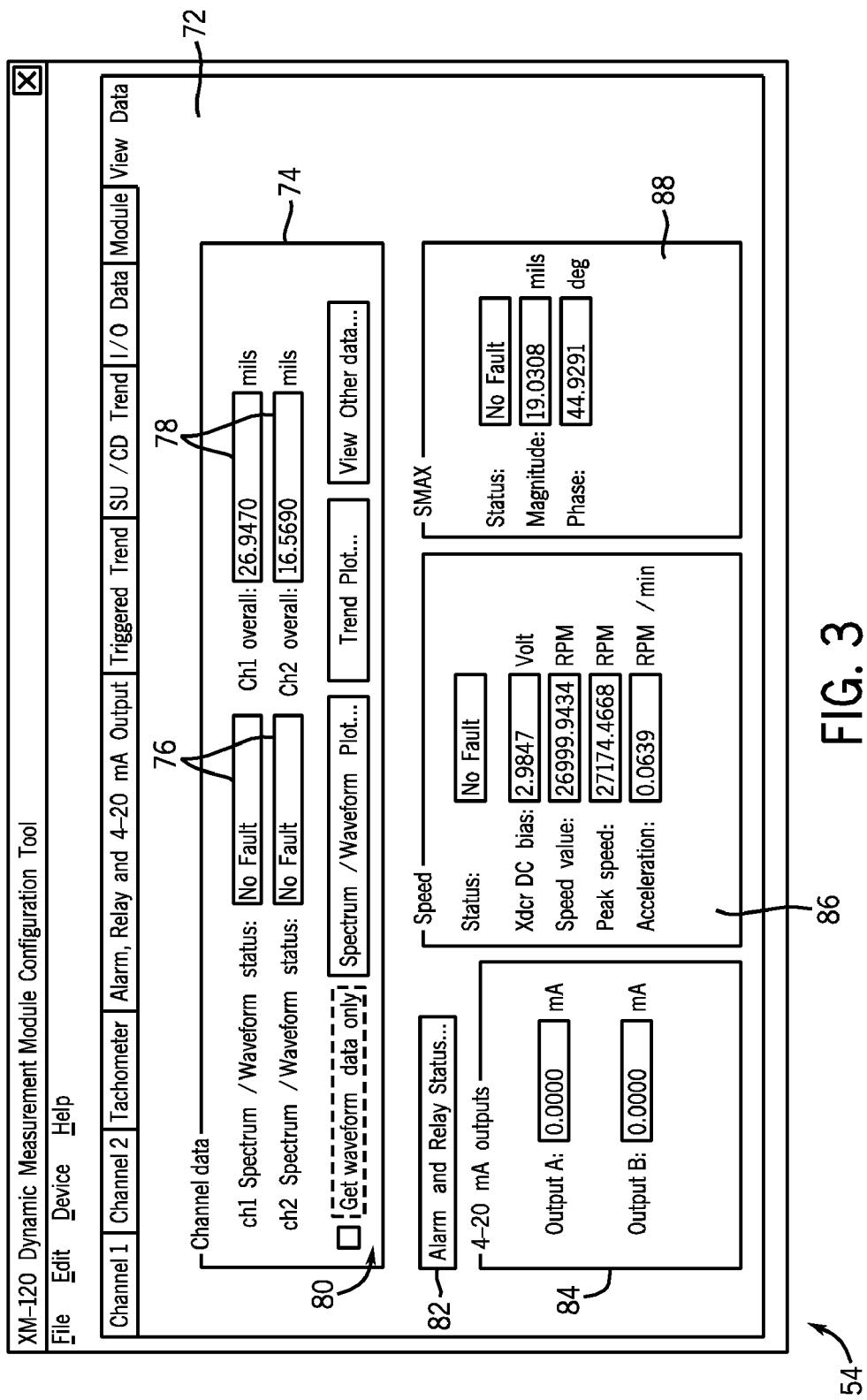
FIG. 3 is a further exemplary interface page for setting and monitoring certain configuration parameters and sensed data from a dynamic monitor.

FIG. 3 illustrates a further page accessible from an exemplary dynamic condition monitor, for indicating certain data monitored by the monitor or by a set of monitors. This data page 72, for example, may include channel data 74 that provides a general status of each channel of the monitor, by way of a general status indicator 76 and numerical indicator 78. Other links to additional pages may be provided, such as indicated at reference numeral 80. Such other pages may include plots or trends of monitored data as described in greater detail below. The data page 72 may include additional information such as alarm and relay status, or the status of any output device controlled by the monitor. In the illustrated example, for example, 4-20 mA outputs may be configured per reference tab 84, such as for driving relays, or audible or visible alarms. The status of such alarms may be indicated as shown at reference numeral 82.

In addition to settings and high-level status indicators, such data pages may be populated with raw or processed data from the sensors coupled to the monitor. By way of example, in FIG. 3, a speed window is provided that indicates status, as well as current and historical speeds based upon information fed by a tachometer in reference tab 86. Other data, as indicated generally at reference numeral 88 may also be provided based upon raw or processed data and settings in the monitor.

Figure 4:
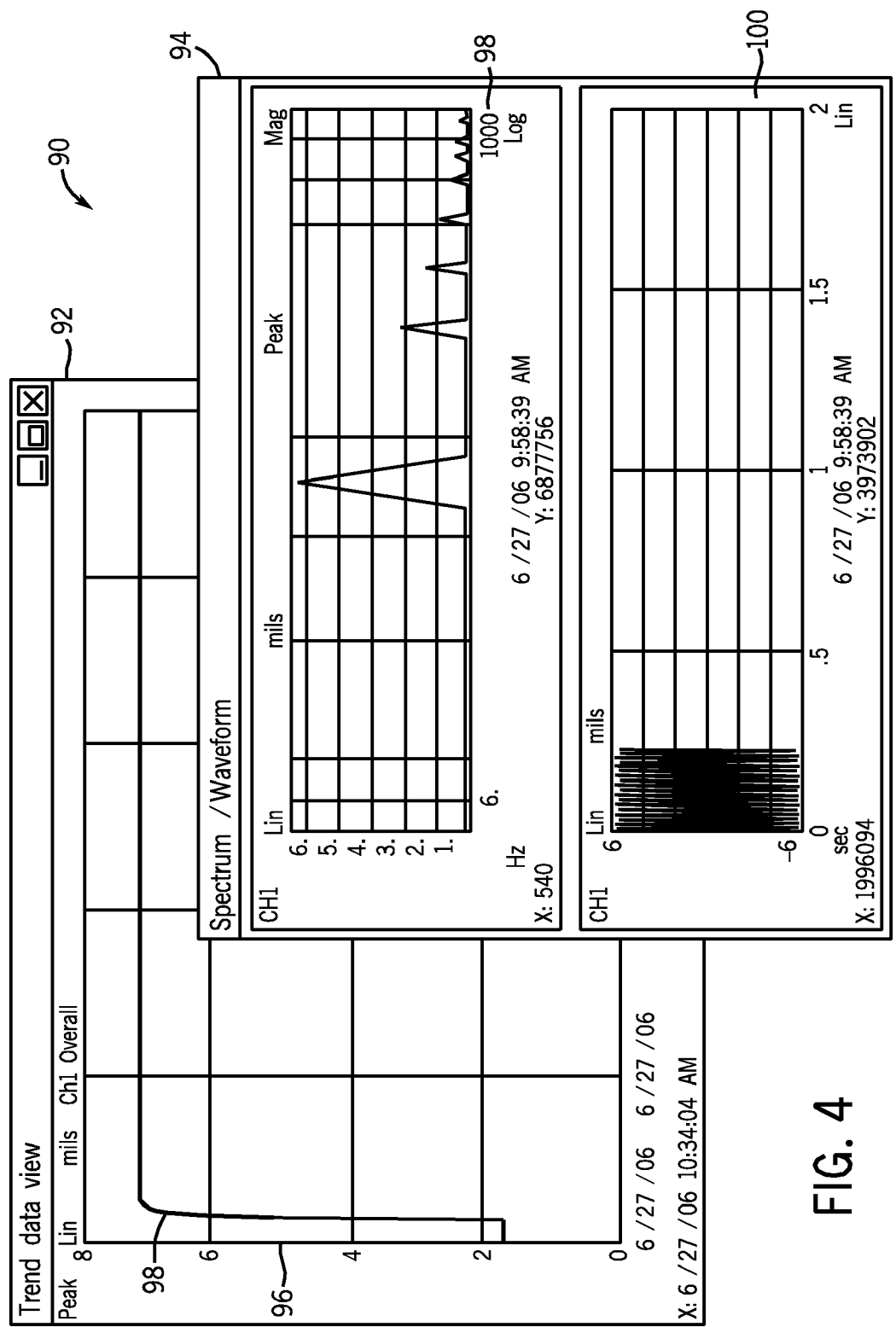
FIG. 4 is a set of interface pages for displaying trend and analysis data served by a dynamic condition monitor in order to summarize data and operational parameters monitored over a period of time.

FIG. 4 illustrates a set of exemplary views for trends and plots, indicated generally by reference numeral 90. Such views may be accessed, for example, by selection by the remote user of one or more of the links from a served page, such as the links 80 shown in FIG. 3. In the exemplary implementation shown in FIG. 4, the monitor would then populate and serve pages or views for historical values or analyses of monitor parameters. For example, FIG. 4 illustrates a trend analysis view 92 and a spectral analysis view 94. The trend analysis view includes, in the illustrated embodiment, a graphical representation 96, such as speed, along with one or more plots 98. The plot 98 will typically be based upon the sensed parameters stored historically in the monitor. Factors such as the scales of the graphical representation may be set in the monitor, such as by means of a graphical user interface page of the type described above. In the embodiment illustrated in FIG. 4, the spectral analysis view 94 may include a plot 98 of a vibration spectrum, as well as a plot 100 for a waveform of monitored vibration. Other waveforms and information may, of course, be provided by means of such graphical output, such as Bode plots, waterfall diagrams, and so forth.

Moreover, the particular information provided in both the views and pages available to be served from any particular monitor, and that can be summarized in a detailed or linked message will depend upon the type of sensors to which the monitor is coupled, and the type of data monitored or processed based upon the sensed signals. For example, it is presently contemplated that such information may include time waveforms, vibration profiles resulting from fast Fourier transforms, power spectra, overall, broadband, integrated, or averaged vibration readings, vibration data that has been specially preprocessed such as for gSE (g spike energy) or similar analysis, alarm signals, monitoring system status information, wavelet transforms, oil or fluid viscosity, oil or fluid TAN (total acid number), oil or fluid moisture content, oil or fluid contaminant level, raw or unprocessed data to be post-processed by remote software, system configuration information, event log or event storage data, and trend data (e.g., time records of monitoring parameters that are stored in the monitoring system).

Figure 5:
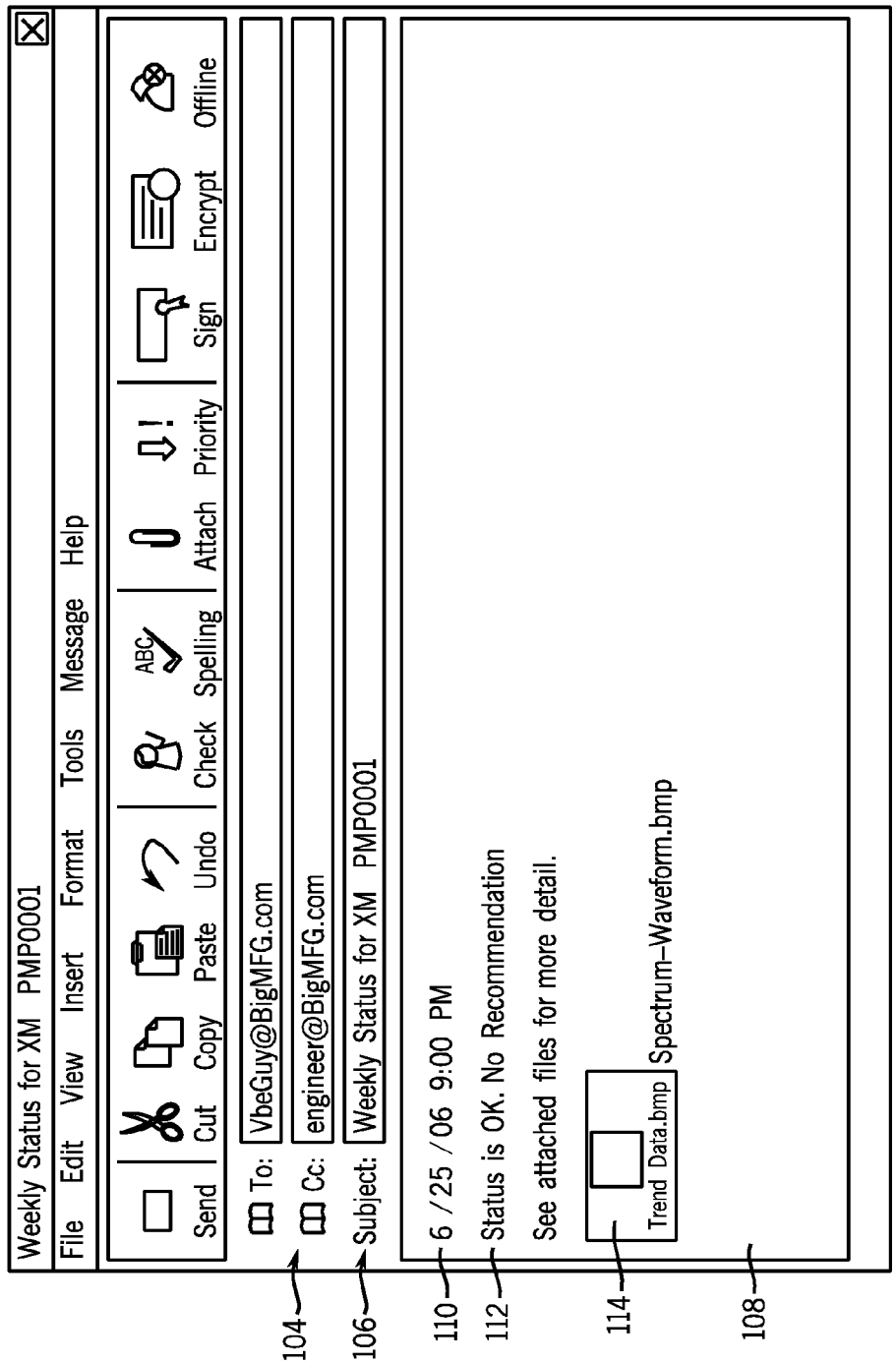
FIG. 5 is an exemplary electronic notification that can be sent by a dynamic condition monitor in accordance with aspects of the present technique to notify operations personnel of monitored dynamic data.
Figure 6:
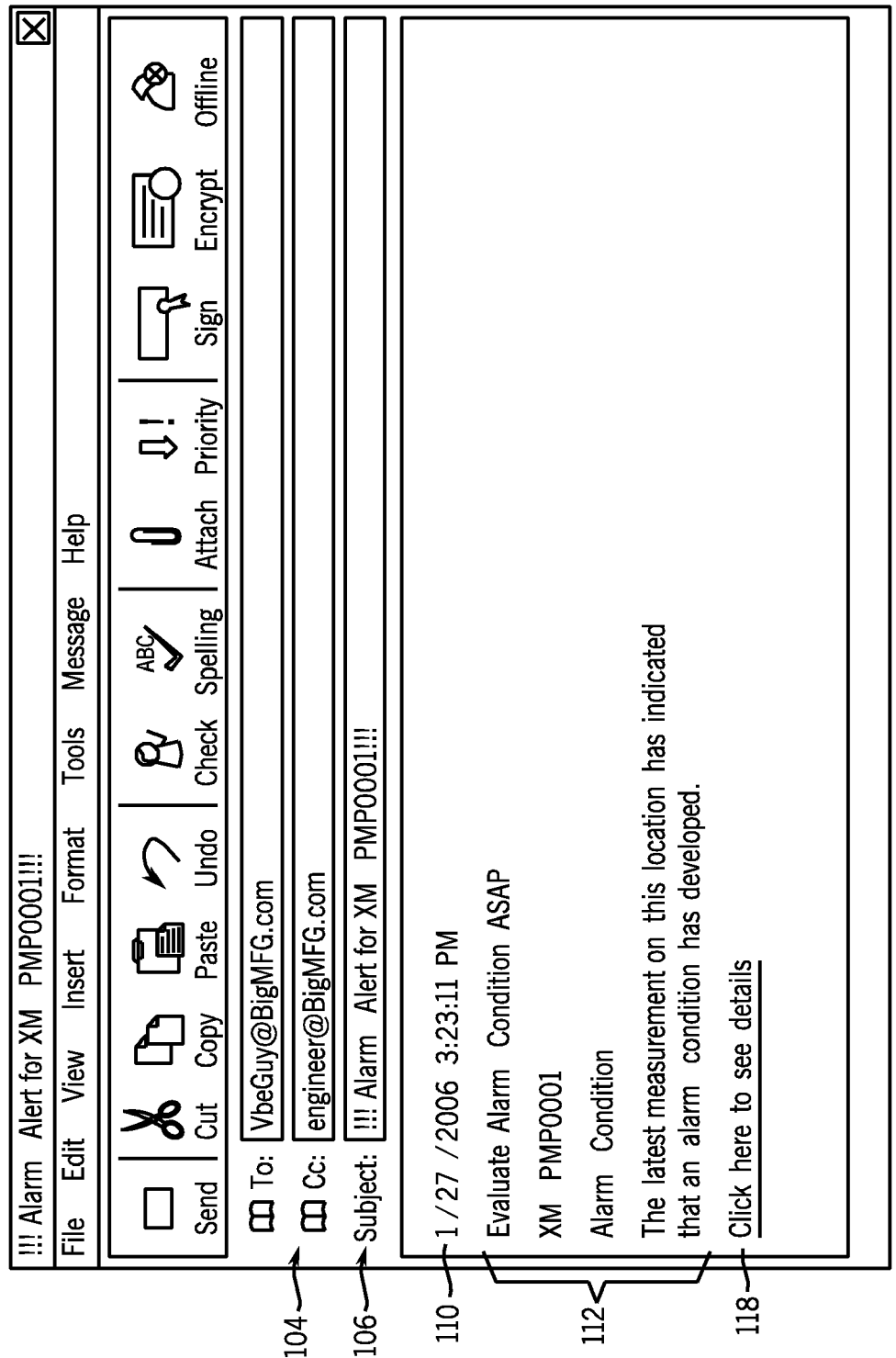
FIG. 6 is a further exemplary electronic message that can be automatically initiated by a monitor when an alarm or other particular condition is detected.

The present invention allows for enhanced reporting and alarm functions heretofore unknown in dynamic condition monitors. For example, the invention will allow for alarms and notifications to be sent through conventional industrial control and monitoring protocols, as well as through electronic messages, electronic reporting approaches, and so forth. FIGS. 5 and 6 illustrate presently contemplate examples for performing such reporting and notification functions.

FIG. 5 is an exemplary electronic notification message 102 that can be configured and sent by a monitor by means of the server software or electronic messaging software stored on the monitor. The message can be pre-programmed into the monitors as a standard message format or template that is populated with data based upon the data monitored by the monitor, and sent based upon settings made in the monitor via graphical interface pages served by the monitor as described above. In the message 102 of FIG. 5, for example, addresses of recipients are provided as indicated at reference numeral 104. These recipients may be specified via graphical user interface pages served by the monitor itself with the addresses being stored in the monitor for notification of operating status of the machine. A subject field 106 is also provided which may also be pre-programmed via a graphical user interface page, and some or all of which may be populated based upon dynamic parameters, such as date, time, and so forth. The notification further includes a message space 108 in which may be provided a time stamp 110, along with a standard or configurable message 112. As will be appreciated by those skilled in the art, in the illustrated example the message 112 may be one of several messages which may be selected based upon the current operating status as analyzed by the dynamic condition monitor. Moreover, the message may include either a link to or an actual file for any one of the types of analysis mentioned above, such as a trend plot, as indicated by reference numeral 114. Such messages may be programmed to be sent periodically to any designated personnel or to a designated address (i.e., a remote system), such as on a daily, weekly or other timed basis. Moreover, such messages may be configured to be sent only on the occurrence of specified events, which may also be programmed and stored in the individual condition monitors. Such events may also be determined by processing performed in the monitor, such as based upon fault trees or intelligent decision algorithms that determine whether a message should be sent and the particular text of the message.

FIG. 6 represents one such triggered message, in this case an alarm message 116. As will be appreciated by those skilled in the art, a number of alarms may be set in the condition monitors for various purposes. For example, different alarm levels may be set for different frequency bands, the limits of which may also be set, so as to allow for the specific tailoring of the monitoring and protection functions to individual systems based upon their typical or desired frequency response. Moreover, multiple alarm levels may be set by an operator for each frequency band and for the multiple frequency bands. Accordingly, the alarm levels may be configured so to define ranges such as minimum and maximum vibration levels. The configurations also permit the alarm levels to be used in various manners. By way of example, attaining certain alarm levels may result in reporting only, while attaining more elevated alarm levels may result in sounding or displaying an alarm, or in energization or de-energization of a relay circuit so as to start or stop a piece of machinery. The rapid analysis of vibration data in this manner, for example, may be used to start or stop electric motors, switch valves, illuminate lights, sound audible alarms, and so forth.

As mentioned above, a number of alarm levels can be configured in the vibration monitor implementation of the present technique via graphical user interface pages served by the server software in each of the monitors. In certain embodiments, an alarm multiplier permits set alarm levels to be increased during certain periods of operation, typically during startup and shutdown, so as to avoid false alarms. Such multipliers may be implemented to avoid such false alarms, either on a speed basis or on a time basis with the steady state alarm levels configured in the monitors being returned following either the preset time or as the system rises above the speed. Other schemes of multiplier implementation may, of course, be envisaged. The use of multipliers, therefore, allows the present system to conform to industry standard specifications, such as API 670, paragraph 5.4.2.5 and Appendix I.

For example, in a current implementation two channels are available in the vibration monitor, with 8 alarm settings being available per channel. The number and a name designation of each alarm may be set, along with parameters for enabling or disabling of each alarm. Conditions for response to the alarm settings may include "greater than," "less than," "inside range," "outside range," and various threshold settings for certain of these. Hysteresis settings may also be provided to prevent false alarms or to prevent clearing of an alarm. Similarly, threshold multipliers and startup periods may be set to prevent false alarms during periods of startup or transition of machinery through certain resonant frequencies. Some or all of these parameters and settings may be input, and checked, via the graphical user interface pages served by the monitors.

The alarm message 116 illustrated in FIG. 6 may be pre-configured, much like the reporting message shown in FIG. 5, but triggered to be sent only upon the detection of an alarm condition of the type described above. Like the message shown in FIG. 5, the message shown in FIG. 6 may be directed to specific personnel via addressing as indicated at reference numeral 104, and may include a subject line which may be pre-programmed or at least partially configured based upon the type and nature of the alarm that triggered the message. A date stamp 110 will typically be provided, along with a message indicating the nature of the alarm and the condition resulting in the alarm, as indicated at reference numeral 112. The automatic message generated by the monitor may also include some sort of recommended action or historical action taken by the monitor. Additional links or other embedded data may also be provided, as indicated generally at reference numeral 118. Thus, a user need not necessarily be present or have access to the monitors themselves, or even to an industrial or other monitoring system to which the monitors are coupled to be notified in a timely manner of any abnormal or unwanted conditions detected by the monitors. It should also be noted that such links may also include links to sites for service providers, such as to obtain additional information and service regarding problems or events occurring on the equipment. A user, then, may be able to rapidly and directly link to a service provider site to arrange for servicing of either analysis of the data, or service contacts (e.g., service visits) to address developing conditions on the equipment.

Figure 7:
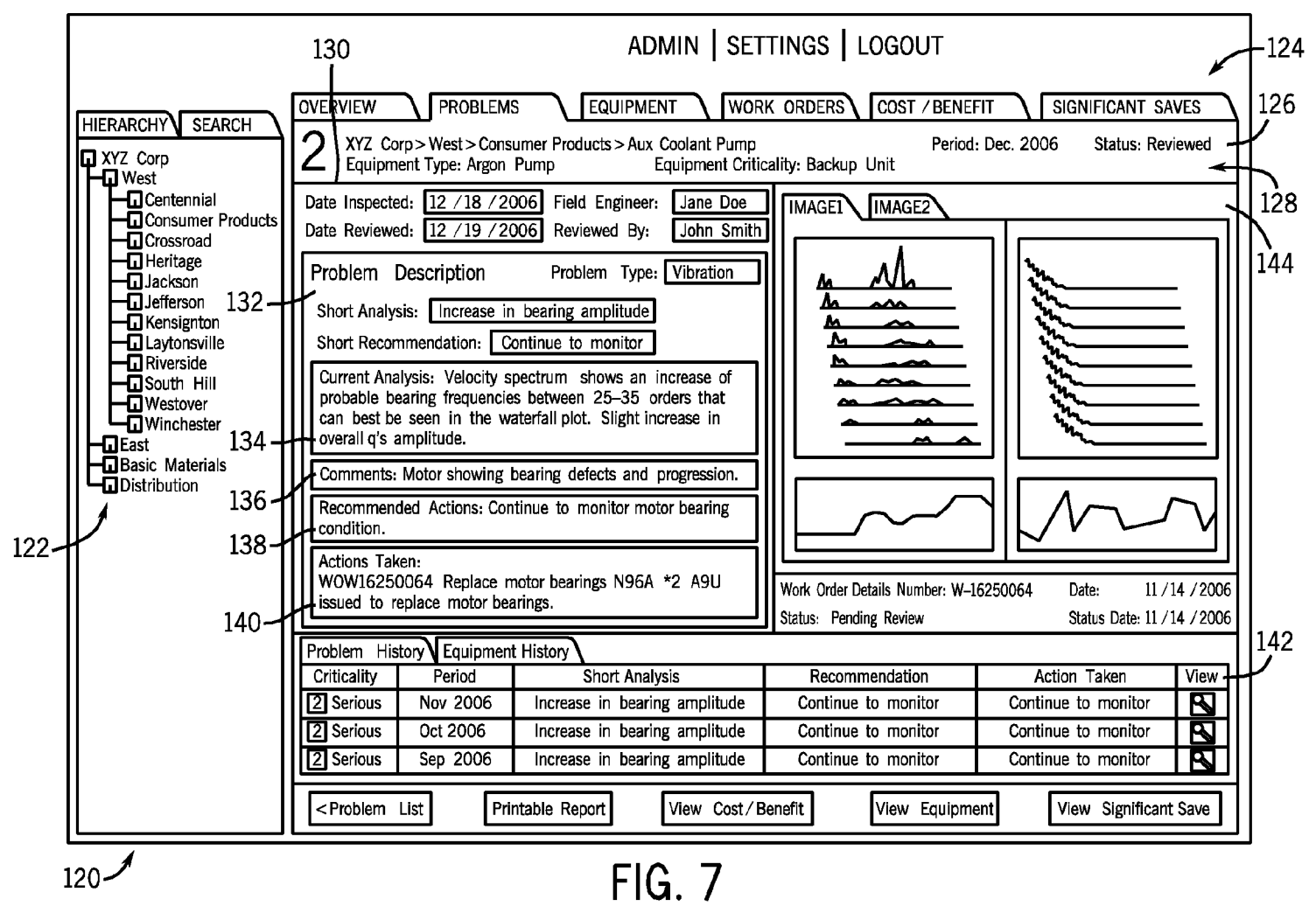

FIG. 7 is an exemplary embodiment for a problem summary page 120 used to provide a substantially complete summary of conditions, both present and historical that have been noted by individual dynamic condition monitors or a collection of monitors. Again, page 120 is populated and served by the monitor itself, or by a series of monitors, or by a host or other device consolidating information from several monitors. In the illustration of FIG. 7, the problem summary page includes a navigation tree 122 that allows the user to identify the machine or machine section to which the particular monitor serving the page is connected. Tabs 124, again, allow the user to navigate to specific types of information, with a "problems" tab being selected in the view of FIG. 7. The page further includes a summary header 126 that again identifies the particular portion of the machine system to which the page applies, as well as other data of interest, such as the monitored period, and so forth. Also in the illustration of FIG. 7, historical information is provided in the fields 130, such as relating to past maintenance or inspection of the machine system. Problem descriptions 132 may be provided, such as relating to the problem detected during inspection, or automatically by the monitor. Additional details 134 may be provided for analysis of particular problems. As noted above, such details may be pre-programmed as text in the monitor, or may include at least certain information that is populated based upon monitored and processed data. A comments field 136 may be provided, which will typically be completed by service personnel, but which may also be completed by remote personnel accessing the page through a network as described above. Similarly, recommended actions 138 may be indicated, as well as indications of historical actions taken as indicated at reference numeral 140. The summary page 120 may also include rich historical data, such as summaries of problems encountered by the monitor, as indicated at reference numeral 142, as well as trends, waveforms, vibration profiles and other graphical representations, as indicated by reference numeral 144. The provision of such summary pages on dynamic condition monitors themselves, along with server software for providing the information remotely, greatly enhances the ability of users to access the information and incorporate the information in complex monitoring and maintenance schedules, as will be appreciated by those skilled in the art.

Figure 8:
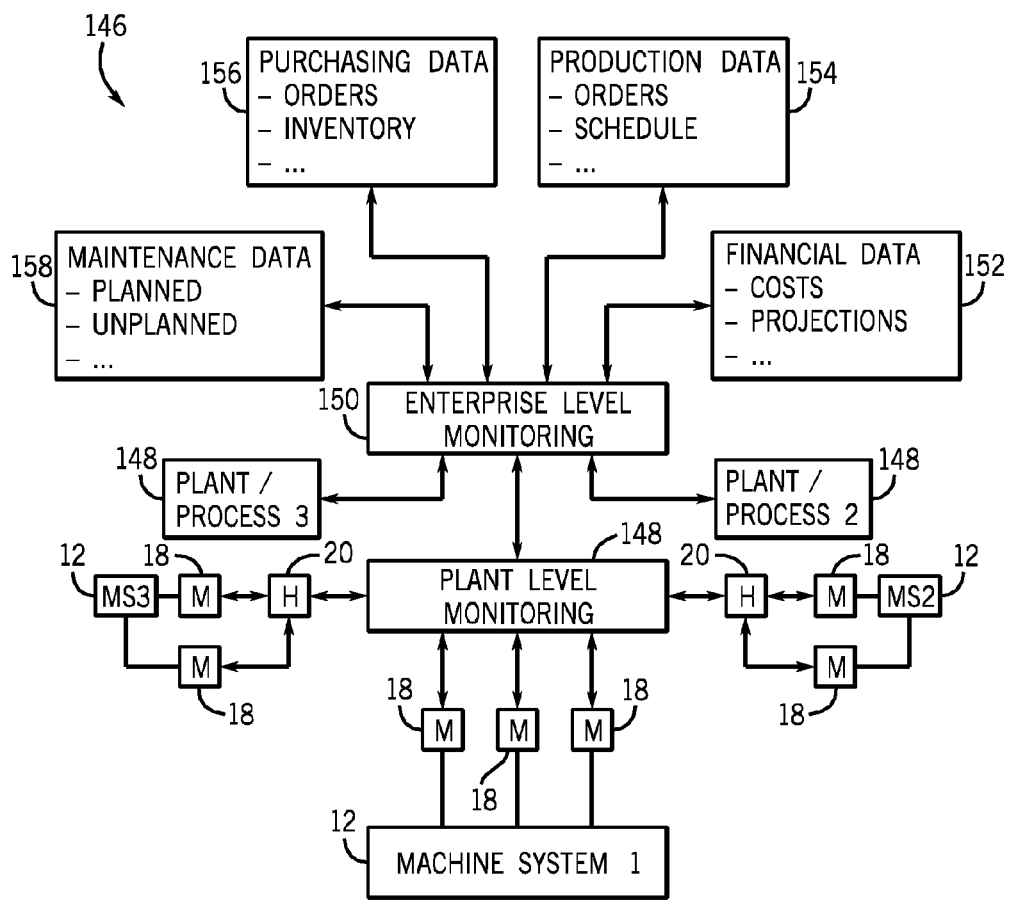
FIG. 8 is a diagrammatical overview of an enterprise-level monitoring scheme that integrates data served by one or more condition monitors and processes such data with data from other resources at an enterprise level.

FIG. 8 represents a high level implementation of monitors of the type described above, equipped with server software for providing detailed information to higher levels in an enterprise, and the combination of such information with other information for such high-level decision making. As shown in FIG. 8, the machine system 12 may be instrumented by a series of monitors 18. Similarly, other machine systems, such as in other parts of a plant or process, may be similarly instrumented. Data from such multiple dynamic condition monitors may then be integrated into a plant level monitoring system as designated by reference numeral 148. Such plant level monitoring may be used for coordinating operation of the various machines or portions of machines from which the data originates. Again, the plant level monitoring 148 may include display or integration of a number of parameters and settings accessed via the server software stored within the individual monitors. Where desired, the plant level monitoring 148 may further process such information for integration purposes. By way of example only, such plant level monitoring may be performed for multiple turbines in a power plant, for multiple production lines in a manufacturing plant, for reactors and related equipment in processing plants, and so forth.

As also represented in FIG. 8, multiple plant level monitoring may be performed, with such monitoring being integrated with enterprise level monitoring 150. The individual plants or processes also benefit from information provided to them from individual machine systems or portions of machine systems as described above. Some or all of this information may be provided via server software in individual monitors as described above. The enterprise level monitoring may incorporate such information, or at least allow for enterprise level personnel to view and analyze issues arising at the machine level. Where desired, the enterprise level monitoring 150 may also allow for integration of parameters in settings served to the individual plant level monitoring systems. The enterprise level monitoring 150 may further include consideration of other data available at an enterprise level. Such data may include financial data 152, such as costs, financial projections, and so forth. Production data 154 may also be considered, such as orders, schedules for production, and so forth. Purchasing data 156 may be considered, such as orders for new parts or machines, inventory of available parts, and so forth. Finally, maintenance data 158 may be considered, such as for planned or unplanned maintenance. As will be appreciated by those skilled in the art, the availability of the machine monitored data at higher levels, such as the plant level and the enterprise level can greatly assist in planning for maintenance functions, replacement of machine parts, scheduling for maintenance, scheduling for production, and so forth. Again, all of these functions will benefit from the availability of raw, processed and analyzed data directly from the dynamic condition monitors by virtue of the server software stored on the monitor themselves.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A dynamic monitoring system for use with rotating machinery, comprising:
   a dynamic monitor configured to be coupled to at least one sensor for detecting a mechanical dynamic parameter of the machinery and to receive signals from the sensor representative of the dynamic parameter; and
   a server integrated in the monitor and storing a plurality of web-accessible pages, the server being configured to populate the pages with data derived from the signals received from the sensor and to serve populated pages to a remote user via a network.

2. The system of claim 1, wherein the mechanical dynamic parameter comprises vibration in the machinery.

3. The system of claim 1, wherein the dynamic monitor is configured to be coupled to a plurality of sensors for detecting a plurality of mechanical dynamic parameters of the machinery, and wherein the monitor is further configured to calculate values based on signals from the plurality of sensors, and wherein the server is configured to populate the pages with the calculated values.

4. The system of claim 1, wherein the at least one sensor includes an accelerometer.

5. The system of claim 1, wherein the monitor is configured to calculate a vibration profile based upon the signals from the at least one sensor, and wherein the server is configured to populate at least one of the pages with a graphical representation of vibration data based upon the profile.

6. The system of claim 1, wherein the monitor is coupled to at least one other dynamic monitor via a communication link and is configured to derive composite data from signals from the at least one sensor and from data received from the at least one other dynamic monitor, and to populate a page with the derived composite data.

7. The system of claim 1, wherein the monitor is a modular monitor configured to be disposed adjacent to a portion of the monitored machinery and to communicate with similar modular monitors disposed adjacent to other portions of the monitored machinery.

8. The system of claim 1, further comprising a plant or enterprise level monitoring system configured to be coupled to the monitor and to other monitors in a plant or enterprise to receive the populated pages and to integrate data received from the monitor with data received from other monitors.

9. The system of claim 8, wherein the plant or enterprise level monitoring system is configured to combine data from the monitor with financial, purchasing, production or maintenance data at an enterprise level.

10. The system of claim 1, wherein settings and parameters for operation of the monitor are alterable via the populated pages.

11. A dynamic monitoring system for use with rotating machinery, comprising:
    a dynamic monitor configured to be coupled to a plurality of sensors to receive signals from the sensors representative of a selected parameter of the monitored machinery; and
    a server integrated in the monitor and storing a plurality of web-accessible pages, the server being configured to populate the pages with data derived from the signals received from the sensors and to serve populated pages to a remote user via a network; and
    a plant or enterprise level monitoring system configured to be coupled to the monitor and to other monitors in a plant or enterprise to receive data used to populate the pages and to integrate data received from the monitor with data received from other monitors.

12. The system of claim 11, wherein the monitor is configured to calculate a vibration profile based upon the signals from the sensors, and wherein the server is configured to populate at least one of the pages with a graphical representation of vibration data based upon the profile.

13. The system of claim 11, wherein the plant or enterprise level monitoring system is configured to combine data from the monitor with financial, purchasing, production or maintenance data at an enterprise level.

14. The system of claim 11, wherein settings and parameters for operation of the monitor are alterable via the populated pages.

15. The system of claim 11, wherein the monitor is coupled to at least one other dynamic monitor via a network link and is configured to derive composite data from signals from the sensors and from data received from the at least one other dynamic monitor, and to populate a page with the derived composite data.

16. The system of claim 11, wherein the alarm condition is based upon a vibration level exceeding a predetermined level.

17. A dynamic monitoring system for use with rotating machinery, comprising:
    a plurality of dynamic monitors, each monitor configured to be coupled to at least one sensor for detecting a mechanical dynamic parameter of the machinery and to receive signals from the sensor representative of the parameter, the dynamic monitors being coupled to one another via a network;
    a server integrated into at least one of the monitors, the server storing a plurality of web-accessible pages, the server being configured to populate the pages with data derived from the signals received from the plurality of monitors and to serve populated pages to a remote user via a network; and a plant or enterprise level monitoring system configured to be coupled at least to the monitor having the integrated server to receive data used to populate the pages and/or the populated pages.

18. The system of claim 17, wherein at least one of the monitors is configured to calculate a vibration profile based upon the signals from at least one sensor, and wherein the server is configured to populate at least one of the pages with a graphical representation of vibration data based upon the profile.

19. The system of claim 17, wherein the plant or enterprise level monitoring system is configured to combine data from the monitor with financial, purchasing, production or maintenance data at an enterprise level.

20. The system of claim 19, wherein settings and parameters for operation of the monitors are alterable via the populated pages.

* * * * *